(12) United States Patent
Molaro et al.

(10) Patent No.: US 8,010,742 B2
(45) Date of Patent: Aug. 30, 2011

(54) USING IDLE MODE PREDICTION TO IMPROVE STORAGE SYSTEM PERFORMANCE

(75) Inventors: Donald Joseph Molaro, Cupertino, CA (US); Jorge Campello de Souza, Cupertino, CA (US); Richard M. H. New, San Jose, CA (US); Damien C. D. Le Moal, Sagamihara (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 403 days.

(21) Appl. No.: 11/760,748

(22) Filed: Jun. 9, 2007

(65) Prior Publication Data

US 2008/0168219 A1 Jul. 10, 2008

Related U.S. Application Data

(60) Provisional application No. 60/878,942, filed on Jan. 4, 2007, provisional application No. 60/878,903, filed on Jan. 5, 2007, provisional application No. 60/878,959, filed on Jan. 5, 2007.

(51) Int. Cl.
*G06F 12/00* (2006.01)

(52) U.S. Cl. ........ 711/112; 711/154

(58) Field of Classification Search .......... 711/112, 711/154
See application file for complete search history.

(56) References Cited

U.S. PATENT DOCUMENTS

| | | | |
|---|---|---|---|
| 5,481,733 A | 1/1996 | Douglis et al. | |
| 5,550,998 A * | 8/1996 | Willis et al. | 711/114 |
| 5,644,786 A * | 7/1997 | Gallagher et al. | 710/30 |
| 5,838,991 A | 11/1998 | Shipman | |
| 5,913,067 A * | 6/1999 | Klein | 713/300 |
| 6,065,123 A | 5/2000 | Chou et al. | |
| 6,587,302 B2 * | 7/2003 | Ahn | 360/77.04 |
| 6,769,019 B2 | 7/2004 | Ferguson | |
| 6,892,313 B1 * | 5/2005 | Codilian et al. | 713/323 |
| 7,075,744 B2 * | 7/2006 | Cumpson et al. | 360/73.03 |
| 7,086,055 B2 | 8/2006 | Stringham | |
| 2004/0205166 A1 * | 10/2004 | DeMoney | 709/219 |
| 2005/0120256 A1 * | 6/2005 | Lu | 713/324 |
| 2005/0268132 A1 * | 12/2005 | Yun et al. | 713/323 |

* cited by examiner

*Primary Examiner* — Hashem Farrokh
(74) *Attorney, Agent, or Firm* — Steven J. Cahill

(57) ABSTRACT

Techniques for optimizing hard disk drive performance. According to one embodiment, a storage system includes a storage unit that stores data and a controller. The controller receives an idle mode indication and performs at least one operation based on the idle mode indication. According to another embodiment, a host system includes a processor and a scheduler that is operative to issues commands. The processor computes the idle mode indication, and the processor sends the idle mode indication to the storage system.

17 Claims, 5 Drawing Sheets

100

USING IDLE MODE PREDICTION TO IMPROVE STORAGE SYSTEM PERFORMANCE

CROSS-REFERENCES TO RELATED APPLICATIONS

This application claims the benefit of U.S. provisional patent application 60/878,942, filed Jan. 4, 2007, U.S. provisional patent application 60/878,903, filed Jan. 5, 2007, and U.S. provisional patent application 60/878,959, filed Jan. 5, 2007, which are incorporated herein by reference.

BACKGROUND OF THE INVENTION

The present invention relates to storage systems, and more particularly, to techniques for optimizing storage system performance.

In modern storage systems, power dissipation is a crucial issue that affects manufacturing costs and reliability. For example, a device that consumes a significant amount of power produces more heat, which requires temperature control devices such as cooling fans, etc. These added devices add to the costs. With regard to reliability, hard disk drives fail more frequently at high operating temperatures. One solution that reduces power dissipation is for a hard disk drive to enter a power saving mode when the hard disk drive is not being accessed by the host system. A hard disk drive typically waits to determine whether there is any activity from the host system. If there is no activity for a certain amount of time, the hard disk drive may then enter a power saving mode. A problem with this solution is that the wait time can be significantly long.

Another problem with this solution is that during a power saving mode, if the hard disk drive receives an input/output (IO) command, the hard disk drive needs to exit the power saving mode, which takes some time. Similarly, if the hard disk drive receives an IO command while the hard disk drive is performing a maintenance operation, it may be difficult or impossible to abort the operation. After exiting the power saving mode or aborting a given maintenance operation, the hard disk drive can then perform the requested task, but with some delay. The delay can be problematic in audio-video (AV) streaming or real-time applications, where additional unexpected command latency may compromise real-time performance.

BRIEF SUMMARY OF THE INVENTION

The present invention provides techniques for optimizing storage system performance. According to one embodiment of the present invention, a storage system 10 includes a storage unit that stores data and a controller. The controller receives an idle mode indication and performs at least one operation based on the idle mode indication. According to an additional embodiment of the present invention, a host system includes a processor and a scheduler that is operative to issue commands. The processor computes an idle mode indication, and the processor sends the idle mode indication to the storage system.

Various objects, features, and advantages of the present invention will become apparent upon consideration of the following detailed description and the accompanying drawings.

DETAILED DESCRIPTION OF THE INVENTION

Some embodiments of the present invention optimize hard disk drive performance by computing an idle mode indication and sending the idle mode indication to the hard disk drive. As described in more detail below, in one embodiment, a host system computes and sends an idle time to the hard disk drive, where the idle time is a time period in which the host system may not issue IO commands to the hard disk drive. Upon receiving the idle time from the host system, the hard disk drive may perform a variety of functions during the idle time. For example, the hard disk drive may enter a power saving mode when the idle time begins, and exit the power saving mode when the idle time ends. Alternatively, the hard disk drive may perform maintenance functions during the idle time. At the end of the idle time, the hard disk drive may be active or otherwise available to receive IO commands from the host system.

In some embodiments, the host system can generate an idle mode indication based on a prediction of when commands will be issued to the hard disk drive in the future. For example, the host system can defer when some commands are sent to the hard disk drive. The host system can then calculate an idle time based on a future period of time during which commands will not be issued to the hard disk drive. The idle time is sent to the hard disk drive. By deferring the issuance of some commands to the hard disk drive, the host system can increase an idle time in the hard disk drive.

Although the present invention disclosed herein is described in the context of hard disk drives, the present invention may apply to other types of storage devices such as optical drives, solid-state storage units, network storage devices, network interface cards, and hybrid disk drives, etc., and still remain within the spirit and scope of the present invention. For example a solid-state device may use indicated idle time to wear level any blocks that may be over used. In the case of a network storage device, it may use the indicated idle time to put the network controller into a power saving mode.

Figure 1:
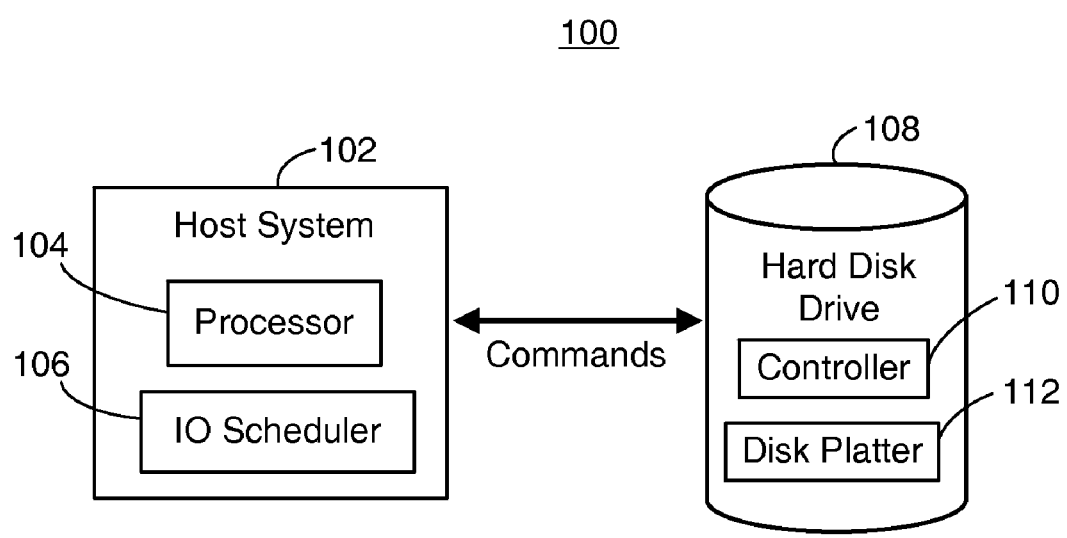
FIG. 1 is a block diagram that illustrates a host system and a hard disk drive, according to an embodiment of the present invention.

FIG. 1 is a block diagram that illustrates a system 100, according to an embodiment of the present invention. The system 100 includes a host system 102, which includes a processor 104 and an input/output (IO) scheduler 106. The system 100 also includes a storage device such as a hard disk drive 108, which includes a controller 110, and a storage unit such as a disk platter 112. For ease of illustration, only the controller 110 and disk platter 112 of the hard disk drive 108 is shown. The hard disk drive 108 may also include other components such as read and write heads, a head actuator mechanism, a spindle motor, etc. The host system 102 may be a digital video recorder (DVR), set-top-box (STB), or any other type of computer system, such as an embedded system, a minimalistic system, hand-held device or computer, etc.

Also, while the IO scheduler 106 is shown residing on the host system 102, the IO scheduler 106 may reside in any suitable location, separate from the host system 102 (e.g., on the hard disk drive 108, etc.). Similarly, while the controller 110 is shown residing on the hard disk drive 108, the controller 110 may reside in any suitable location, separate from the hard disk drive 108 (e.g., on the host system 102, etc.).

In operation, the host system 102 sends IO commands to the hard disk drive 108. Based on the IO commands, the hard disk drive 108 may perform requested functions such as reading data, writing data, erasing data, etc. As described in more detail below, the host system 102 may also send an idle mode indication to the hard disk drive 108. In one embodiment, the idle mode indication may include an idle time. In one embodiment, an idle time may be a time period in which the hard disk drive 108 does not receive a command. In one embodiment, the idle time may be a time period in which the hard disk drive 108 is free to perform any operations separate from operations based on IO commands from the host system 102. For example, in particular embodiments, such operations (separate from operations based on IO commands) may include power saving operations and maintenance operations. In some embodiments, power saving operations may include entering and exiting power saving modes.

In one embodiment, the idle mode indication may include a start time for the idle time (e.g., in 5 microseconds), a stop time for the idle time (e.g., in 2 seconds), etc. The hard disk drive 108 may then utilize the information of idle mode indication to perform a variety of internal functions such as power saving and maintenance functions during the duration of the idle time. In one embodiment, the idle mode indication may include one or more idle states, where an idle state may include one or more power saving mode.

Figure 2:
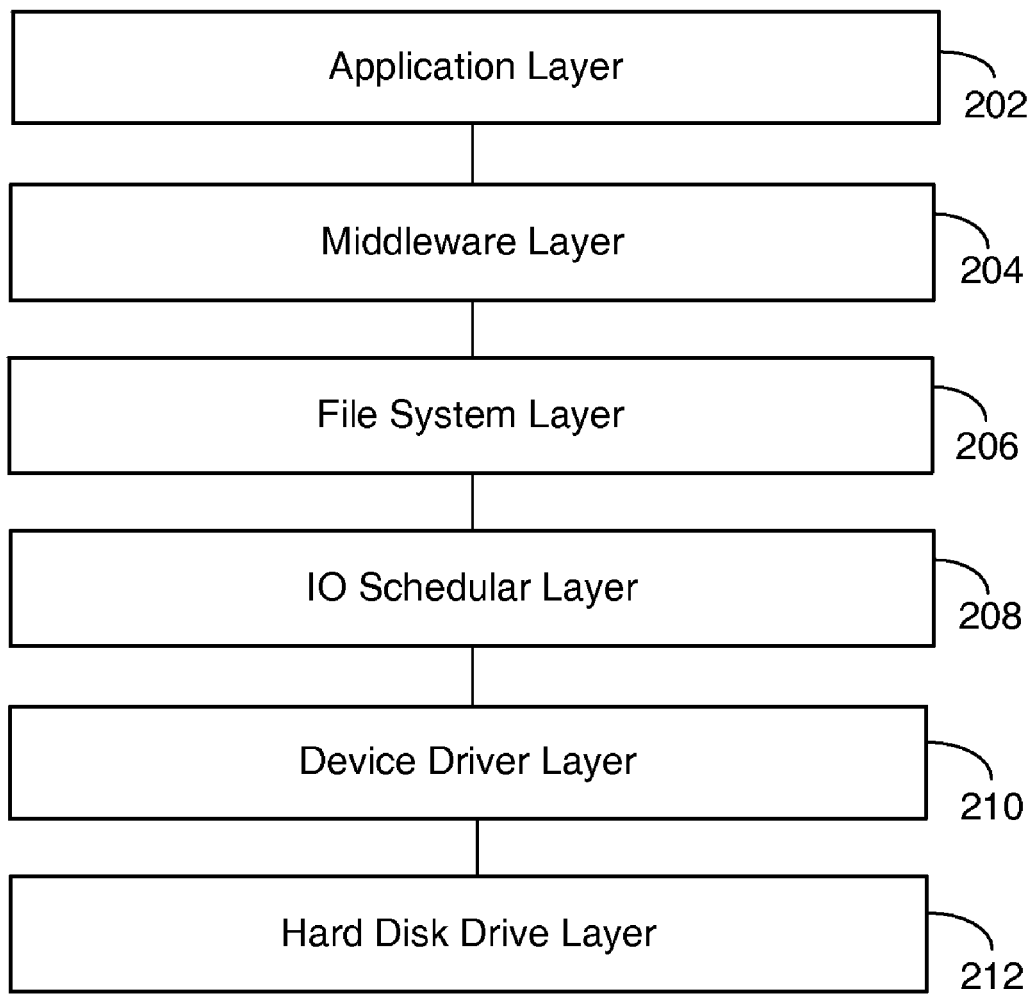
FIG. 2 is a block diagram that illustrates a software stack, according to an embodiment of the present invention.

FIG. 2 is a block diagram that illustrates a software stack 200, according to an embodiment of the present invention. The software stack 200 includes an application layer 202, a middleware layer 204, a file system layer 206, an IO scheduler layer 208, a device driver layer 210, and a hard disk drive layer 212. In one embodiment, the application layer 202 may provide a user interface for the user to control the host system 102. The middleware layer 204 may provide buffering for IO streams. The file system layer 206 may manage data blocks that are stored at the hard disk drive layer 212 (e.g., on the hard disk drive 108). The IO scheduler layer 208 may schedule IO commands that the host system 102 sends to the hard disk drive 108. The device driver layer 210 drives devices such as the hard disk drive 108. The hard disk drive layer 212 includes the hard disk drive 108.

In operation, the software stack 200 handles multiple AV streams for the host system 102. As described above, in one embodiment, the middleware layer 204 provides buffering for IO streams. Typically, each IO stream may be allocated some buffer space from a shared pool of buffer memory on the host system 102. The middleware layer 204 keeps track at every point in time of how much AV data is stored in each buffer, and also keeps track of the bit rate at which the data is being emptied out (e.g., for a read stream) or filled up (e.g., for a write stream) by the application layer above it. The following figure shows how buffers may be managed by the middleware layer 204.

Figure 3:
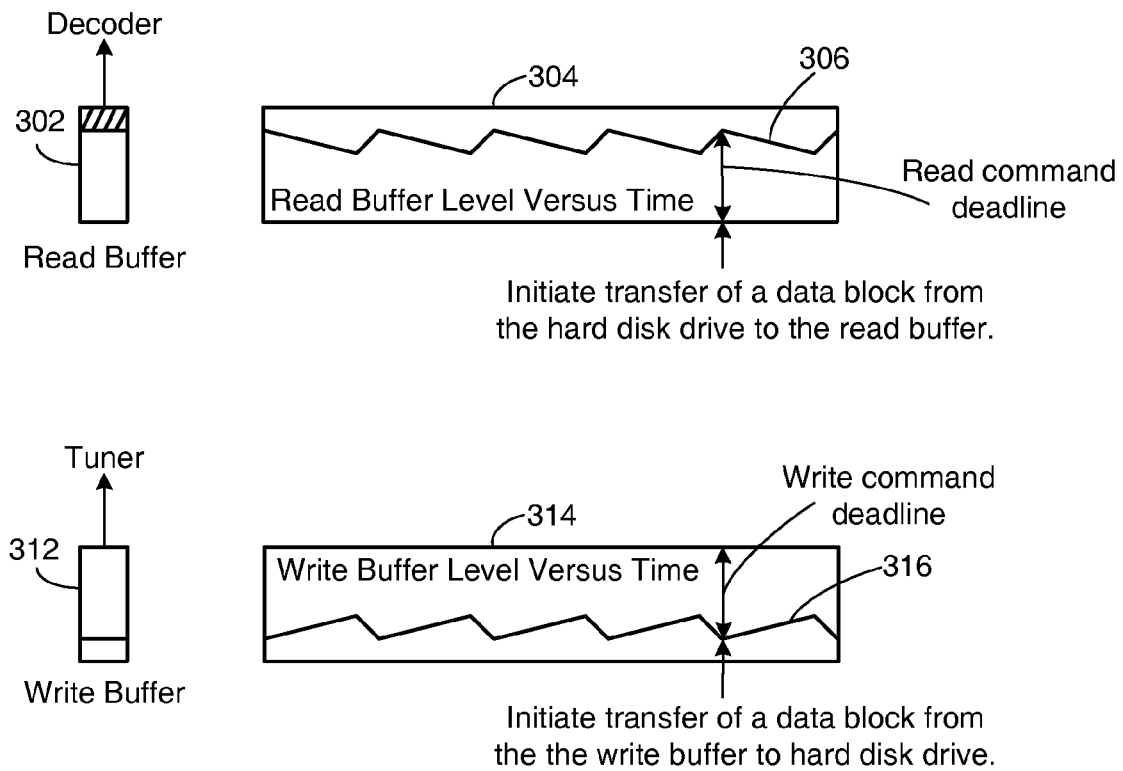
FIG. 3 is a block diagram that illustrates buffers for read and write streams, according to an embodiment of the present invention.

FIG. 3 is a block diagram that illustrates buffers for read and write streams, according to an embodiment of the present invention. FIG. 3 shows a read buffer 302 and a corresponding graph 304 illustrating the read buffer level 306 versus time. FIG. 3 also shows a write buffer 312 and a corresponding graph 314 illustrating the write buffer level 316 versus time.

For read streams, data is read in bursts from the hard disk drive 108 to the read buffer 302, and read out at a more-or-less constant rate to a decoder for decoding and rendering. The bit rate at which data is read out from the read buffer 302 is in general variable, but the host software can estimate the average or worst case bit rate for the stream. At any moment in time, the middleware layer 204 keeps track of the amount of data in the read buffer 302, and the approximate bit rate at which it is being read out. Using this information, the host system 102 can estimate how long it will take for the read buffer to be emptied out. If a new read command is issued by the host system 102 to fill up the empty space in the buffer, then the deadline for that read command may be computed by dividing the amount of data stored in the buffer (e.g., in MB) by the bit rate at which data is being removed from the read buffer 302 (e.g., in MB/sec).

For write streams, data is written to the write buffer 312 at a more-or-less constant rate as it comes in from a tuner or receiver, and then written in bursts to the hard disk drive 108. The host software must ensure that the write buffer 312 does not overflow. If a new write command is issued, the deadline for that write command can be computed by dividing the amount of free space in the buffer 312 (e.g., in MB) by the bit rate at which the data is coming in from the tuner or receiver (e.g., in MB/sec).

In a more complex case, the host software may simultaneously manage multiple read and write streams. Each stream may generate IO commands to the hard disk drive 108, and for each IO command, the host software may compute a deadline by which that IO command needs to be completed. In one embodiment, the IO scheduler 106 maintains a queue of IO commands to be sent to the hard disk drive 108, where each IO command has an associated deadline.

In one embodiment, the IO scheduler 106 may defer some IO commands, provided their deadlines are not imminent. In one embodiment, deferring an IO command means that the IO scheduler 106 may choose not to issue that IO command even though the hard disk drive 106 may be idle and ready to accept a new command. In some embodiments, the IO scheduler 106 may utilize a simple model of hard disk drive performance to estimate IO command completion times. A model may be simple in that the IO Scheduler 106 need not take into account the precise characteristics of the hard disk drive 108. As such, the IO scheduler 106 may estimate how long a given command will take based on an equation that may or may not vary based upon the particular hard disk drive. In some embodiments, some hard disk drive models may provide a more accurate prediction of how long a given command will take. A more accurate prediction may result in better estimates of IO completion times and thus better estimates of the idle time of the hard disk drive. However, the IO scheduler 106 may provide an accurate estimate with a simple model without having to examine multiple hard disk drives.

In one embodiment, deferring IO commands in this way may increase the amount of idle time for the hard disk drive 108. Increasing the amount of idle time may maximize idle time windows, which leads to lower power consumption and greater reliability in the storage device. Deferring IO commands also increases the size of the queue of outstanding commands on the host system 102, on average, which leads to greater scheduling efficiency, because the IO scheduler 106 has more freedom in how it can resort incoming IO commands to minimize seek time on the hard disk drive 108.

In one embodiment, the host system 102 may compute idle times, because the host system 102 knows the bit rate of the data coming in (e.g., 2 MB/second) and knows the size of a given buffer (e.g., 10 MB). As such, the host system 102 may compute the amount of time before needing to access the hard disk drive 108 by dividing the buffer size by the bit rate (e.g., 10 MB/2 MB/second=5 seconds). The resulting amount is the idle time.

In one embodiment, the IO scheduler 106 may group IO commands together into batches by selectively deferring some IO commands, as described above. Grouping IO commands into larger batches increases the idle times. Each batch of IO commands contains multiple commands, with each individual command having a deadline. In some embodiments, the IO scheduler 106 computes how long it will take to complete a batch of IO commands, or an individual IO command. As such, the IO scheduler 106 may determine when each batch of IO commands needs to be issued in order to ensure that none of the command deadlines are missed. The IO scheduler 106 may defer commands as long as possible in such a way that no command deadlines are missed. In this way, the IO scheduler 106 may also increase the amount of idle time seen by the hard disk drive 108. Because the IO scheduler has knowledge of when each batch of IO commands must be issued, it can estimate the duration of the idle time that will be seen by the hard disk drive 108.

In one embodiment, the host system 102 issues a message to the hard disk drive 108, where the message contains one or more idle times. In one embodiment, the message may include the expected duration of the idle time, quantized in blocks of 10 milliseconds. In one embodiment, the message may include a start idle time and an end idle time. In one embodiment, the message may include an optional bit that indicates whether the hard disk drive 108 should spin up on its own shortly before the end of the specified idle time period. This bit may be used if the host system 102 knows for certain that another IO command will be issued at the end of the idle time period.

The hard disk drive 108 uses the idle time information to make operational decisions such as entering a power saving mode or performing maintenance functions. When in a power saving mode, the exact algorithm that the hard disk drive 108 uses to determine the optimum power state transitions depends on the power state machine, as well as the number of power states, the amount of power consumed in each state, the energy and time required to transition between states, and possibly other factors. These power states may differ from hard disk drive to hard disk drive, and the actual internal algorithms used by the hard disk drive 108 to drive power state transitions may be proprietary algorithms. Example power states are described below in connection with FIG. 5.

In one embodiment, it may be useful for the hard disk drive 108 to be aware of whether the host system will issue a message containing an idle time. For instance, if the hard disk drive 108 knows that the host system will inform the hard disk drive 108 about all future idle time periods, the hard disk drive 108 may override its own internal algorithms used to estimate idle time start times and durations. In one embodiment, the hard disk drive 108 has a mode that is configured through a SET FEATURES command. When in this mode, the hard disk drive 108 assumes that it will be notified by the host about upcoming idle time intervals.

Figure 4:
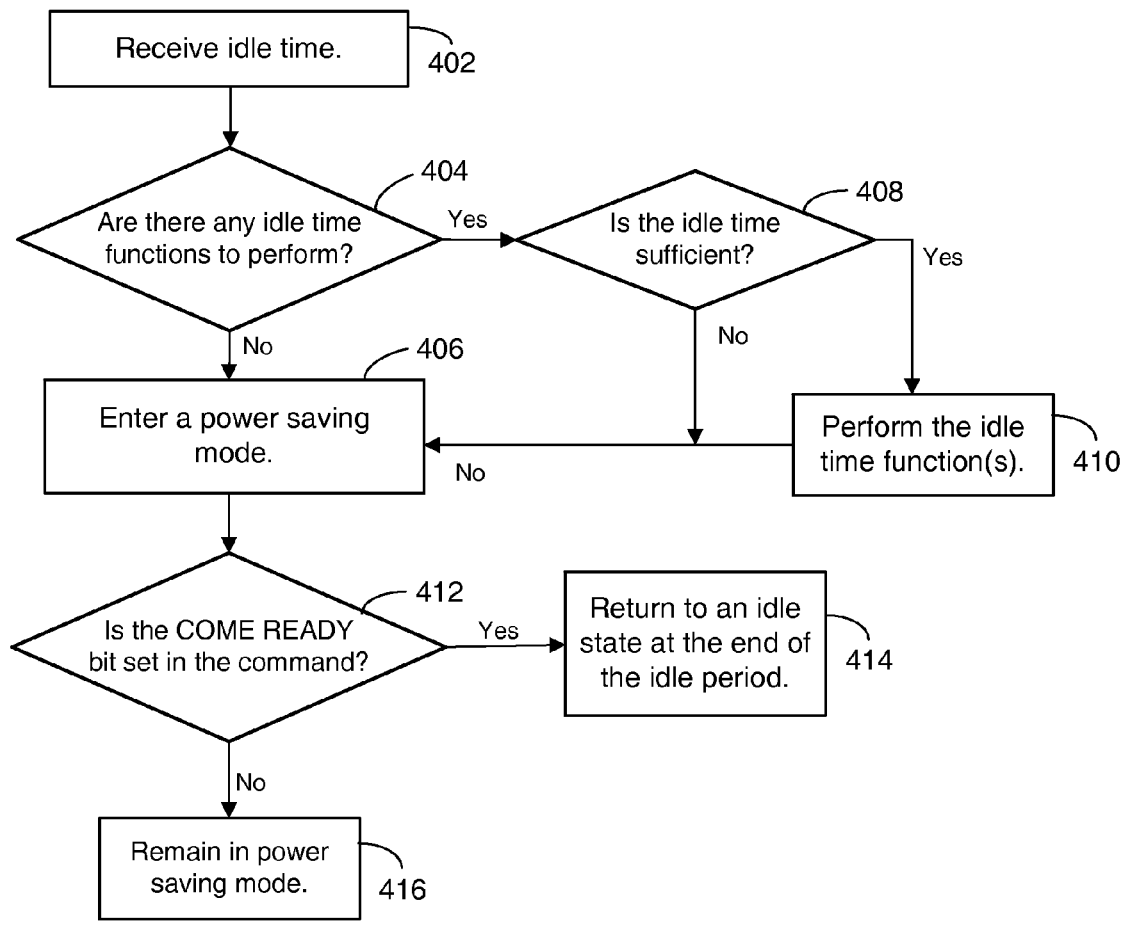
FIG. 4 is a flow chart that illustrates a process for utilizing the idle time, according to an embodiment of the present invention.

FIG. 4 is a flow chart that illustrates a process that allows a storage device such as a hard disk drive to utilize the idle time, according to an embodiment of the present invention. The process begins at step 402 where the hard disk drive 108 receives the idle time in a message from outside the hard disk drive (e.g., from the host system 102). The message is an example of an idle mode indication. Alternatively, the idle time can be computed in an IO scheduler within the hard disk drive.

At step 404, the hard disk drive 108 determines if there are any idle time functions to perform. If there are no idle time functions to perform, at step 406, the hard disk drive 108 enters a power saving mode. As described in more detail below in connection to FIG. 5, the hard disk drive 108 determines which power state to transition into based on the idle time.

At step 408, the hard disk drive 108 determines if the idle time is sufficient to complete one or more idle time functions. If not, the hard disk drive 108 enters a power saving mode at step 406. If the idle time is sufficient to complete an idle time function, in step 410, the hard disk drive 108 performs and completes the idle time function. For example, in one embodiment, the hard disk drive 108 may perform one or more maintenance functions. Maintenance functions may include, for example, head sweeps, temperature recalibration, etc. If the idle time is sufficiently long (e.g. 50 sec), the hard disk drive 108 can park the head, which reduces power. Because the head is not on the surface of the disk platter when parked, the hard disk drive 108 cannot crash, which increases reliability. Also, the hard disk drive 108 can turn the server off to make sure that the server head, which keeps the servo head on its track on the disk, does not wear out too quickly. Other idle time functions may include recalibration functions, logging functions, etc. For example, if the host system 102 has not issued a request to the hard disk drive 108 in the last several minutes, the hard disk drive 108 may begin a servo-recalibration operation or a SMART logging operation.

Knowing idle times facilitates the hard disk drive 108 in avoiding the issue of a new command coming in during the middle of the idle time operation, because the hard disk drive 108 knows whether or not to initiate a given idle time function based on the idle time.

For this reason, in the preferred embodiment, the hard disk drive 108 also makes use of the information about idle times received from the host system in order to decide when to initiate its own internal idle time operations. This embodiment results in smaller command latencies, because idle time functions are interrupted less frequently.

In one embodiment, the hard disk drive 108 may perform additional idle time functions if there is sufficient idle time remaining. After the hard disk drive 108 completes one or more idle time functions, the hard disk drive 108 then enters a power saving mode. At step 412, the hard disk drive then determines if the COME READY bit is set in the command. In one embodiment, the COME READY bit indicates if the hard disk drive 108 is currently capable of accepting an IO command from the host system 102. If the COME READY is set, in step 414, the hard disk drive 108 returns to an idle state at the end of the idle period. If the come-ready bit is not set, in step 416, the hard disk drive 108 remains in a power saving mode.

In some instances, the host system 102 may not be able to always accurately estimate the duration of the idle time. For example, at any time, some unpredictable user-initiated activity may cause the host to initiate a new sequence of activities that may cause new IO events to the hard disk drive 108. For this reason, the idle times that are enabled by the host scheduling algorithm, and about which information is passed to the hard disk drive 108, may be pre-empted or curtailed at any time by new IO requests. Similarly, the hard disk drive 108 may initiate idle time operations on its own if the host does not provide sufficient idle time periods for the hard disk drive 108 to complete its own required internal idle time functions.

Figure 5:
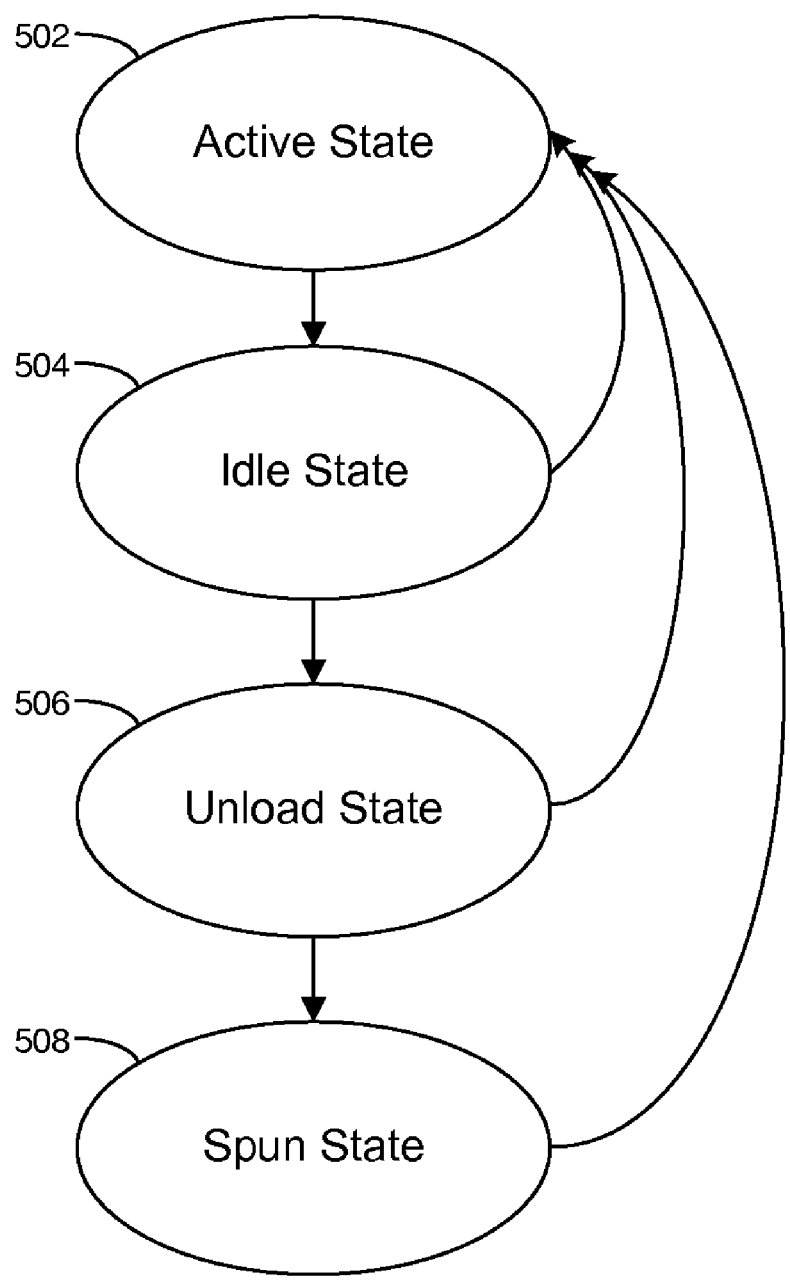
FIG. 5 is a state diagram that illustrates power state transitions of the hard disk drive, according to an embodiment of the present invention.

FIG. 5 is a state diagram that illustrates power state transitions of the hard disk drive 108, according to an embodiment of the present invention. FIG. 5 shows an active state 502, an idle state 504, an unloaded state 506, and a spun state 508. In one embodiment, the states consume different amounts of power, and the hard disk drive 108 has the ability to initiate transitions between these states.

In one embodiment, the active state 502 is a state in which the hard disk drive 108 is servicing IO commands. In one embodiment, the idle state 504 is a state in which the hard disk drive 108 is ready to service incoming commands with minimum delay. In one embodiment, the unloaded state 506 is a state in which the head has been unloaded from the disk but the disk platter 112 is still spinning. In one embodiment, the spun down state 108 is a state in which the disk platter 112 has been spun down and is no longer rotating.

In some embodiments, the hard disk drive 108 knows the idle time, which is received from the host system 102. If the idle time is short, it may be advantageous for hard disk drive 108 to switch into a moderate power saving mode (such as the unloaded state 506) in order to minimize recovery time. If the idle time is long, it may be advantageous for hard disk drive 108 to switch into a more aggressive power saving mode (such as the spun down state 508) in order to save the most power. Because the hard disk drive 108 knows the idle time, the hard disk drive 108 can determine the sequence of power state transitions that minimizes device power consumption.

The following are tables showing example formats of the idle time messages that the host system 102 may send to the hard disk drive 108. Tables 1-4 show examples of task files. In one embodiment, the command code may be vendor specific, and the protocol may be programmed input/output (PIO) data-out. In one embodiment, LBA means logical block array, DEV indicates the selected device, BSY may be cleared to zero indicating command completion, DRDY may be set to one, DF (device fault) may be cleared to zero or set to one if a device fault has occurred, DRQ may be cleared to zero, ABRT shall be set to one if this command is not supported or if the device is not able to complete the action requested by the command, and ERR may be set to one if an Error register bit is set to one. Obs means obsolete, DEV means device selection, and NA means not assigned or not applicable.

TABLE 1

| | Reigster | | | | | | | |
|---|---|---|---|---|---|---|---|---|
| | 7 | 6 | 5 | 4 | 3 | 2 | 1 | 0 |
| Features | | | | Vendor Specific | | | | |
| Sector Count | | | | 01h | | | | |
| LBA Low | | | | 00h | | | | |
| LBA Mid | | | | 00h | | | | |
| LBA High | | | | NA | | | | |
| Device/Head | obs | NA | obs | DEV | | NA | | |
| Command | BSY | DRDY | DF | NA | DRQ | NA | NA | ERR |

TABLE 2

| | Register | | | | | | | |
|---|---|---|---|---|---|---|---|---|
| | 7 | 6 | 5 | 4 | 3 | 2 | 1 | 0 |
| Error | | | | NA | | | | |
| Sector Count | | | | NA | | | | |
| LBA Low | | | | NA | | | | |
| LBA Mid | | | | NA | | | | |
| LBA High | | | | NA | | | | |
| Device | obs | NA | obs | DEV | | NA | | |
| Status | BSY | DRDY | DF | NA | DRQ | NA | NA | ERR |

TABLE 3

| | Register | | | | | | | |
|---|---|---|---|---|---|---|---|---|
| | 7 | 6 | 5 | 4 | 3 | 2 | 1 | 0 |
| Error | NA | NA | NA | NA | NA | ABRT | NA | Obs |
| Sector Count | | | | NA | | | | |
| LBA Low | | | | NA | | | | |
| LBA Mid | | | | NA | | | | |
| LBA High | | | | NA | | | | |
| Device | obs | NA | obs | DEV | | NA | | |
| Status | BSY | DRDY | DF | NA | DRQ | NA | NA | ERR |

In one embodiment, Table 4 defines the content of an example command from the host system 102, where the data transferred controls the function of this command.

TABLE 4

| Byte | Content |
|---|---|
| 0-3 | Estimated duration of the idle time period, in units of 10 ms. The value zero is not allowed and will cause the command to abort. |
| 4 | Bit zero of this byte is the COME READY bit, which contains a flag to indicate whether the HDD should put itself back into the idle state (ready to receive and process a command with minimal delay) at the end of the estimated idle time period. If the COME READY bit is set to zero, then the HDD does not try to come ready at the end of estimated the idle time period. |

The foregoing description of the exemplary embodiments of the present invention has been presented for the purposes of illustration and description and is not intended to be exhaustive or to limit the scope of the present invention to the examples disclosed. A latitude of modification, various changes, and substitutions are intended in the present invention. In some instances, features of the present invention can be employed without a corresponding use of other features as set forth. Many modifications and variations are possible in light of the above teachings, without departing from the scope of the present invention. It is not intended that the scope of the present invention be limited with this detailed description.

The invention claimed is:

1. A storage system comprising:
   a storage unit that stores data, wherein at least one command associated with the data is deferred, and wherein deferring the at least one command increases an idle time of the storage unit; and
   a controller coupled to the storage unit, wherein the controller receives an idle mode indication, wherein the controller determines when the at least one command is to be issued and defers the at least one command such that a deadline is not missed, and wherein the controller performs at least one operation upon receiving the idle mode indication.

2. The storage system defined in claim 1 wherein the idle mode indication comprises the idle time, and wherein the at least one operation comprises:
   entering a power saving mode when the idle time begins; and
   exiting the power saving mode when the idle time ends.

3. The storage system defined in claim 1, wherein the idle mode indication comprises the idle time, wherein the idle time is a time period in which the storage system does not receive a command, and wherein the at least one operation comprises performing at least one maintenance function during the idle time.

4. The storage system defined in claim 1, wherein the idle mode indication comprises at least one idle state.

5. The storage system defined in claim 1 wherein the storage system is a solid-state storage device.

6. The storage system defined in claim 1 wherein the storage system is a network interface card.

7. The storage system defined in claim 1 wherein the storage system is a hybrid disk drive.

8. A storage system comprising:
a storage unit that stores data, wherein a plurality of commands are grouped into batches of commands, and wherein grouping the commands increases an idle time of the storage unit; and
a controller coupled to the storage unit, wherein the controller receives an idle mode indication, and wherein the controller performs at least one operation upon receiving the idle mode indication.

9. A computer system that comprises code for optimizing hard disk drive performance, wherein the code is stored on a computer readable medium, the computer system comprising:
code for receiving an idle mode indication that is determined based on a prediction of when future commands will be sent to a hard disk drive;
code for determining when the at least one command is to be issued;
code for deferring the at least one command such that a deadline is not missed, wherein deferring the at least one command increases an idle time of the hard disk drive; and
code for performing at least one operation based on the idle mode indication.

10. The computer system defined in claim 9 wherein the idle mode indication comprises the idle time, and wherein the code for performing the at least one operation based on the idle mode indication further comprises code for:
entering a power saving mode when the idle time begins, the idle time being determined based on the idle mode indication; and
exiting the power saving mode when the idle time ends.

11. The computer system defined in claim 9 further comprising code for performing at least one maintenance function during the idle time that is determined based on the idle mode indication.

12. A computer system that comprises code for optimizing hard disk drive performance, wherein the code is stored on a computer readable medium, the computer system comprising:
code for receiving an idle mode indication that is determined based on a prediction of when future commands will be sent to a hard disk drive, wherein a plurality of commands are grouped into batches of commands, and wherein grouping the commands increases an idle time of the hard disk drive; and
code for performing at least one operation based on the idle mode indication.

13. A host system for optimizing performance of a storage system, the host system comprising:
a processor; and
a scheduler that is operative to issue commands, wherein the processor computes an idle time, wherein the scheduler determines when at least one of the commands is to be issued and defers the at least one of the commands such that a deadline is not missed, wherein deferring the at least one of the commands increases the idle time of the storage system, and wherein the processor sends the idle time to the storage system.

14. The host system defined in claim 13 wherein the storage system is a hard disk drive.

15. The host system defined in claim 13 wherein the storage system is a solid-state storage device.

16. The host system defined in claim 13 wherein the storage system is a network interface card.

17. The host system defined in claim 13 wherein the storage system is a hybrid disk drive.

* * * * *